(12) United States Patent
Leverett

(10) Patent No.: US 7,185,911 B1
(45) Date of Patent: Mar. 6, 2007

(54) CART HAVING A RETRACTABLE TONGUE COUPLING SYSTEM

(75) Inventor: Joel Leverett, Oxford, AL (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/809,614

(22) Filed: Mar. 25, 2004

(51) Int. Cl.
  *B62B 1/00* (2006.01)
  *B62B 3/00* (2006.01)

(52) U.S. Cl. .................. 280/656; 280/652; 280/47.371; 280/659

(58) Field of Classification Search ........... 280/47.371, 280/47.34, 651, 652, 656, 30, 63, 491.2, 280/87.01, 46, 479.2, 480.1, 481
See application file for complete search history.

(56) References Cited

U.S. PATENT DOCUMENTS

| | | | |
|---|---|---|---|
| 1,178,857 A | 4/1916 | Kirner | |
| 2,446,223 A | 8/1948 | Forney | |
| 2,447,737 A | 8/1948 | Christensen | |
| 2,876,036 A | 3/1959 | Olson | |
| 3,014,738 A | 12/1961 | Kasten | |
| 3,083,986 A | 4/1963 | Moody et al. | |
| 3,140,003 A | 7/1964 | Horner | |
| 3,236,539 A * | 2/1966 | Ketterer | 280/87.01 |
| 3,326,573 A | 6/1967 | Neitzey, Jr. | |
| 3,403,924 A * | 10/1968 | Oliveira | 280/656 |
| 3,734,540 A | 5/1973 | Thiermann | |
| 3,944,257 A | 3/1976 | Dockins | |
| 4,175,768 A * | 11/1979 | Thackray | 280/652 |
| 4,232,990 A | 11/1980 | Pierce | |
| 4,887,836 A * | 12/1989 | Simjian | 280/651 |
| 5,108,122 A | 4/1992 | Beagley | |
| 5,249,823 A * | 10/1993 | McCoy et al. | 280/656 |
| 5,653,458 A * | 8/1997 | Chaparian | 280/30 |
| 5,853,189 A * | 12/1998 | Swartzlander | 280/652 |
| 6,488,307 B2 | 12/2002 | Koon | |
| 6,773,025 B1 * | 8/2004 | Zelm | 280/656 |
| 6,889,994 B1 * | 5/2005 | Birkenbaugh | 280/491.2 |

* cited by examiner

*Primary Examiner*—Hau Phan
(74) *Attorney, Agent, or Firm*—Rankin, Hill, Porter & Clark LLP; Vincent Ciamacco

(57) ABSTRACT

A cart for transporting objects is provided. The cart includes a base structure supported on a plurality of wheels. An elongated tongue is telescopically mounted to an underside of the base structure and is movable between an extended position, wherein the tongue extends in front of the cart, and a retracted position, wherein the tongue is disposed under the cart. A hitch apparatus is mounted to the base structure at the posterior end thereof. The hitch apparatus includes a hitch for receiving a tongue of another cart and a locking assembly for locking the tongue to the hitch. The locking assembly includes a pin movable between locking and release positions. A tongue actuator is connected to the tongue and is operable, upon manipulation by an operator, to move the tongue from the retracted position to the extended position, while a hitch actuator is connected to the pin of the locking assembly and is operable, upon manipulation by an operator, to move the pin from the locking position to the release position. The tongue actuator is disposed toward one side of the cart and the hitch actuator is disposed toward one side of the cart. Both the tongue actuator and the hitch actuator are configured so as to be ergonomically accessible by an operator.

46 Claims, 7 Drawing Sheets

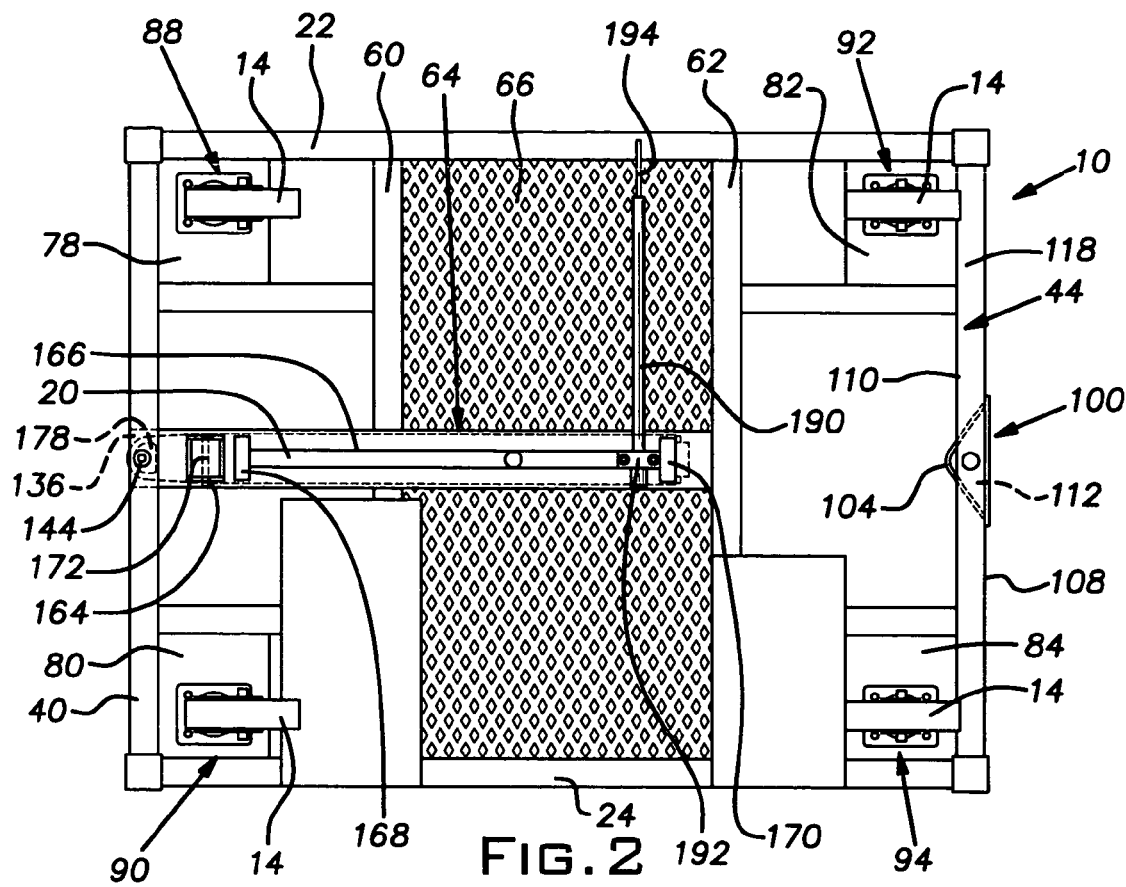
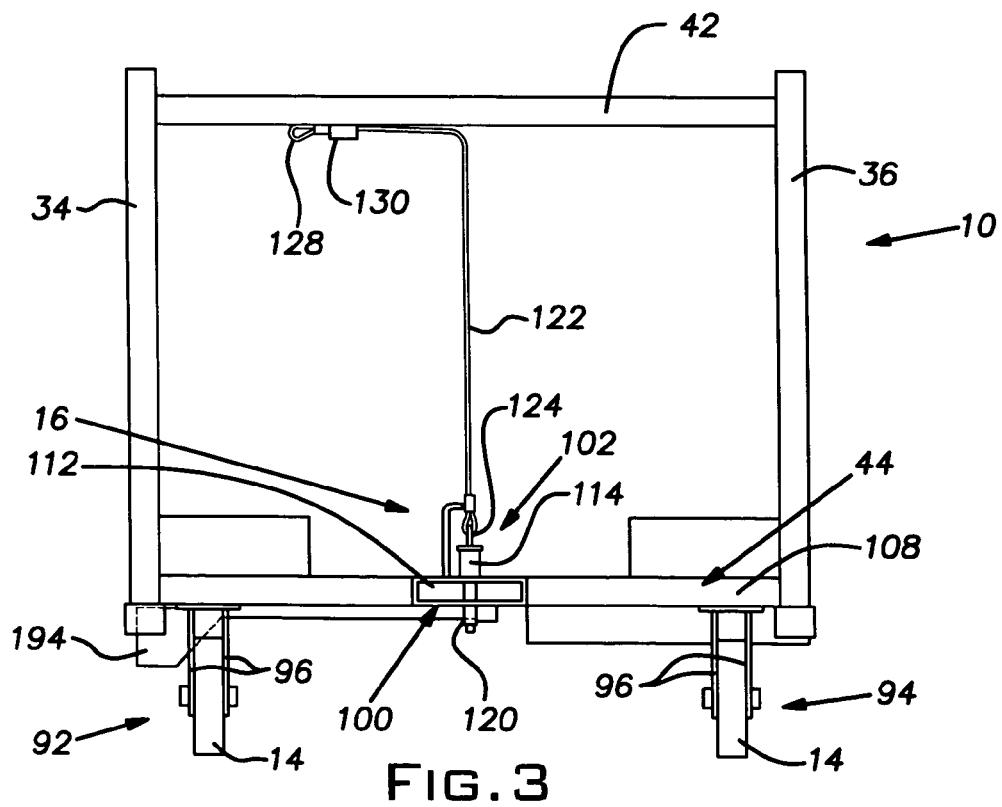

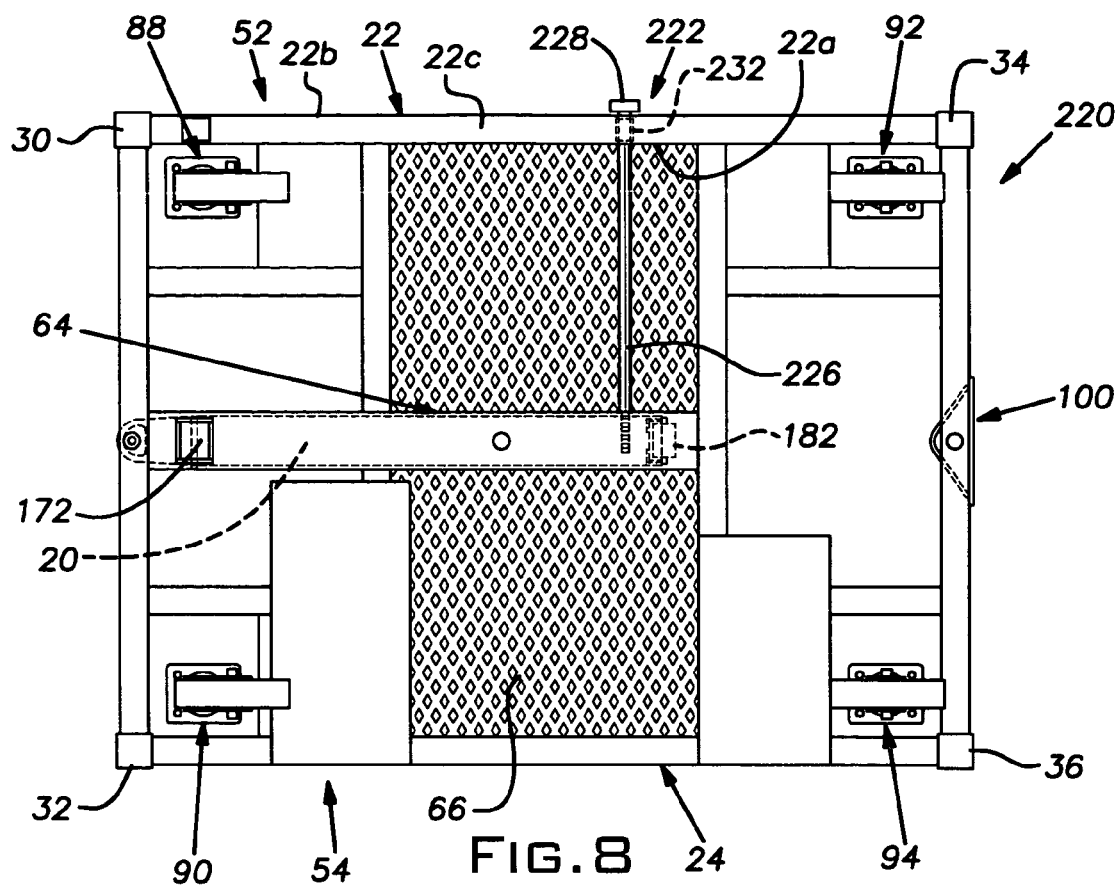
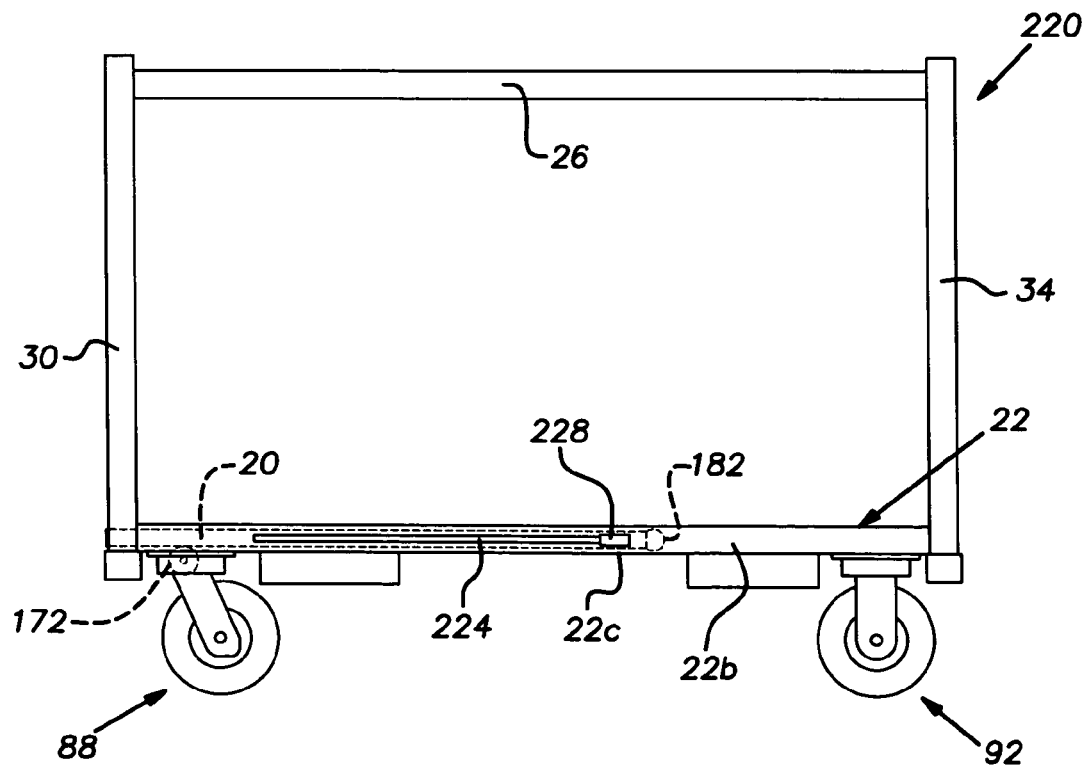

CART HAVING A RETRACTABLE TONGUE COUPLING SYSTEM

BACKGROUND OF THE INVENTION

The present invention is directed toward carts and, more particularly, toward carts having coupling systems for interconnecting a plurality of the carts and/or connecting the carts to tow vehicles.

Carts are used in a wide variety of applications. In an industrial facility, such as an automotive manufacturing facility, carts are used to transport parts and other objects between different locations in the facility. The carts are often interconnected and towed by a motorized vehicle, such as a tow motor. Conventionally, an industrial type of cart has a coupling system that includes a tongue coupling apparatus mounted to an underside of the cart, toward the front thereof. The tongue coupling apparatus includes a tongue that is telescopically disposed in a mount secured to an underside of the cart. The tongue is movable between retracted and extended positions and has an outer end with an opening formed therein, or a coupling member mounted thereto, for engaging a hitch on a motorized vehicle or another cart. A locking mechanism is usually provided to lock the tongue in the extended position. Examples of tongue coupling systems are shown in U.S. Pat. No. 2,876,036 to Olson and U.S. Pat. No. 2,446,223 to Forney.

In order to use a conventional tongue coupling apparatus, an operator must typically unlock the locking mechanism by hand, pull the tongue out to the extended position by hand and pull the cart by the tongue to a second cart or a motorized vehicle. The operator must then lift a pin on a hitch of the second cart, or motorized vehicle, with one hand, while holding and guiding the tongue into the hitch with the other hand. The operator then releases the hitch pin to join the cart to the second cart, or to the motorized vehicle. All of these operations are typically performed by the operator while the operator is in a bent-over position. As can be appreciated, performing such operations, while in a bent-over position, is not ergonomically desirable.

Based on the foregoing, there exists a need in the art for a cart having a retractable tongue coupling system with improved ergonomic features. The present invention is directed to such a cart.

SUMMARY OF THE INVENTION

In accordance with the present invention, a cart for transporting objects is provided. The cart includes a base structure having pairs of first and second wheels mounted thereto, towards first and second sides of the base structure, respectively. A housing is mounted to the base structure and at least partially defines an interior channel. The housing extends in a longitudinal direction of the cart and is disposed midway along a width of the cart. An elongated tongue adapted for connection to another cart is at least partially disposed in the channel and is movable between a retracted position, wherein a majority of the tongue is disposed inside the channel, and an extended position, wherein a majority of the tongue is disposed outside the channel.

In accordance with one aspect of the invention, a tongue actuator is connected to the tongue and is disposed laterally outward from the housing. The tongue actuator is operable, upon manipulation by an operator, to move the tongue from the retracted position to the extended position.

In accordance with another aspect of the present invention, a hitch apparatus is mounted to the base structure at the posterior end thereof. The hitch apparatus includes a hitch, a locking assembly and a hitch actuator. The hitch is disposed midway along the width of the cart and defines a tongue-receiving space for receiving a second coupling tongue of a second cart. The locking assembly includes a pin movable between a locking position, wherein the pin extends through the space to lock the second tongue of the second cart to the hitch, and a release position, wherein the pin is disposed above the space to unlock the second tongue of the second cart from the hitch. The hitch actuator is connected to the pin of the locking assembly and is disposed laterally outward from the hitch. The hitch actuator is operable, upon manipulation by an operator, to move the pin from the locking position to the release position.

BRIEF DESCRIPTION OF THE DRAWINGS

The features, aspects, and advantages of the present invention will become better understood with regard to the following description, appended claims, and accompanying drawings where:

FIG. 2 is a bottom plan view of the first cart;

FIG. 3 is a rear view of the first cart;

FIG. 8 is a bottom plan view of a third cart embodied in accordance with a third embodiment of the present invention;

FIG. 9 is a side view of the third cart; and

DETAILED DESCRIPTION OF THE PREFERRED EMBODIMENTS

Figure 1:
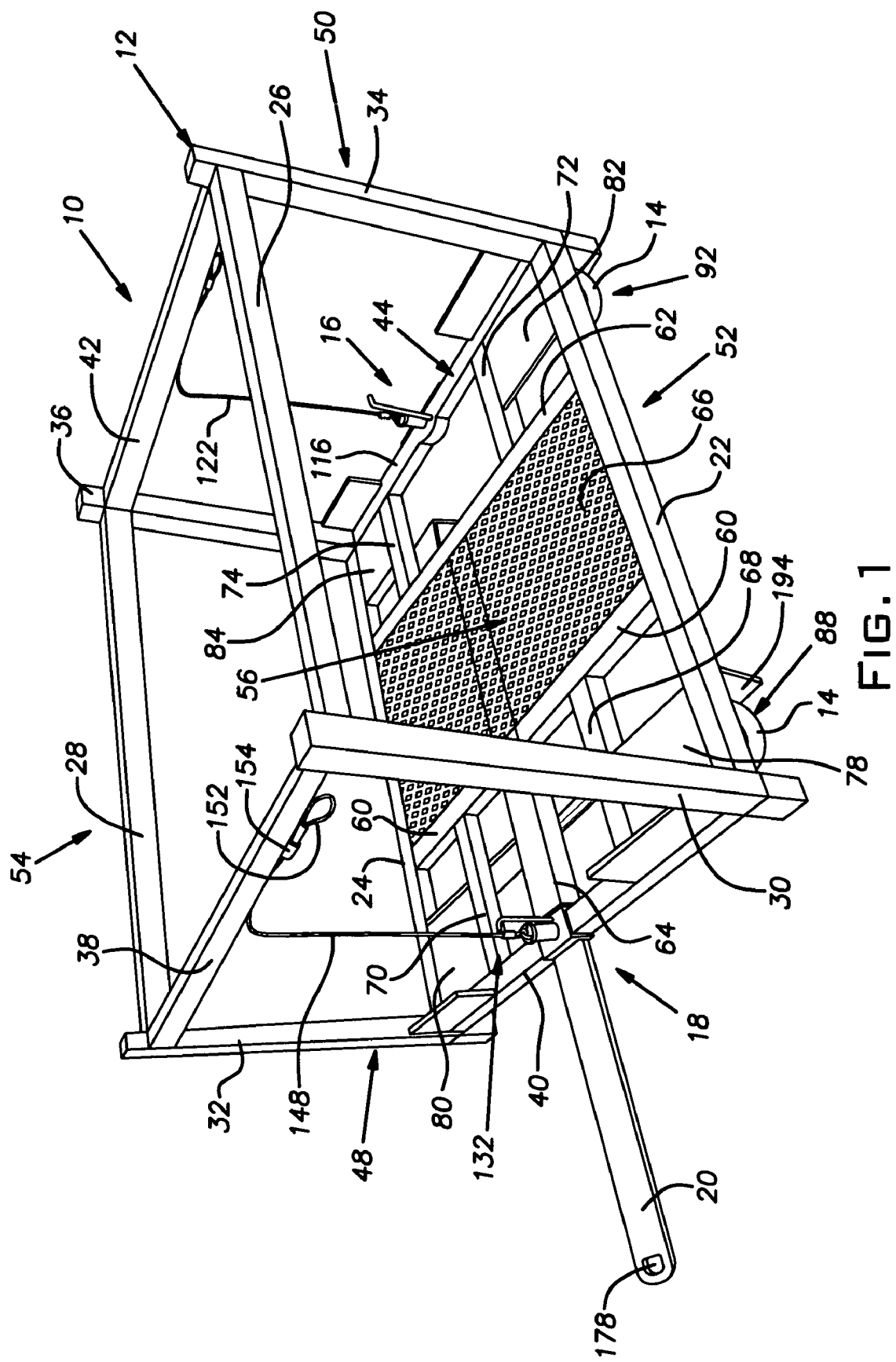
FIG. 1 is a front corner perspective view of a first cart embodied in accordance with a first embodiment of the present invention.

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Referring now to FIGS. 1–3, there is shown a cart 10 embodied in accordance with a first embodiment of the present invention. The cart 10 generally includes a frame-like body 12 supported on a plurality of wheels 14. The cart 10 further includes a coupling system for interconnecting a plurality of the carts 10, or for connecting the cart 10 to a motorized vehicle, such as a tow motor. The coupling system includes a rear recessed hitch apparatus 16 and a front tongue apparatus 18 having an extendable tongue 20.

The body 12 includes first and second lower side bars 22, 24, first and second upper side bars 26, 28, first and second front posts 30, 32, first and second rear posts 34, 36, upper and lower front bars 38, 40 and upper and lower rear bars 42, 44, all of which are preferably composed of a strong rigid material, such as steel, and have rectangular cross-sections.

The upper and lower front bars 38, 40 extend between the first and second front posts 30, 32, with lower end portions of the first and second front posts 30, 32 being joined (by welding or otherwise) to opposing ends of the lower front bar 40, respectively, and upper end portions of the first and second front posts 30, 32 being joined (by welding or otherwise) to opposing ends of the upper front bar 38, respectively. Similarly, the upper and lower rear bars 42, 44 extend between the first and second rear posts 34, 36, with lower end portions of the first and second rear posts 34, 36 being joined (by welding or otherwise) to opposing ends of the lower rear bar 44, respectively, and upper end portions of the first and second rear posts 34, 36 being joined (by welding or otherwise) to opposing ends of the upper rear bar 42, respectively. In this manner, the upper and lower front bars 38, 40 and the first and second front posts 30, 32 cooperate to define a front structure 48 of the body 12, while the upper and lower rear bars 42, 44 and the first and second rear posts 34, 36 cooperate to define a rear structure 50 of the body 12.

The first lower and upper side bars 22, 26 extend between the first front and rear posts 30, 34, with lower end portions of the first front and rear posts 30, 34 being joined (by welding or otherwise) to opposing ends of the first lower side bar 22, respectively, and upper end portions of the first front and rear posts 30, 34 being joined (by welding or otherwise) to the opposing ends of the first upper side bar 26, respectively. Similarly, the second lower and upper side bars 24, 28 extend between the second front and rear posts 32, 36, with lower end portions of the second front and rear posts 32, 36 being joined (by welding or otherwise) to opposing ends of the second lower side bar 24, respectively, and upper end portions of the second front and rear posts 32, 36 being joined (by welding or otherwise) to the opposing ends of the second upper side bar 28, respectively. In this manner, the first lower and upper side bars 22, 26 and the first front and rear posts 30, 34 cooperate to define a first side structure 52 of the body 12, while the second lower and upper side bars 24, 28 and the second front and rear posts 32, 36 cooperate to define a second side structure 54 of the body 12.

In addition to the front and rear structures 48, 50 and the first and second side structures 52, 54, the body 12 of the cart 10 includes a base structure 56 having an outer frame formed by the first and second lower side bars 22, 24, the lower front and rear bars 40, 44, the lower end portions of the first and second front posts 30, 32 and the lower end portions of the first and second rear posts 34, 36. A pair of first lateral beams 60 and a second lateral beam 62 are disposed toward the center of the base structure 56 and extend between the first and second lower side bars 22, 24. The first lateral beams 60 and the second lateral beam 62 are preferably composed of strong rigid material, such as steel. Inner ends of the first lateral beams 60 are connected together by a sheath or housing 64 of the tongue apparatus 18, while outer ends of the first lateral beams are joined (by welding or otherwise) to the first and second lower side bars 22, 24, respectively. The second lateral beam 62 is joined at its ends (by welding or otherwise) to the first and second lower side bars 22, 24, respectively. A floor panel 66 is secured over and supported by the first lateral beams 60, the second lateral beam 62 and the housing 64. The floor panel 66 may be grated (as shown) or solid. Longitudinally-extending first and second front support bars 68, 70 are joined between the first lateral bars 60 and the lower front bar 40, and longitudinally-extending first and second rear support bars 72, 74 are joined between the second lateral beam 62 and the lower rear bar 44. A first front mounting plate 78 is secured between and supported by the first lower side bar 22 and the first front support bar 68, while a second front mounting plate 80 is secured between and supported by the second lower side bar 24 and the second front support bar 70. Similarly, a first rear mounting plate 82 is secured between and supported by the first lower side bar 22 and the first rear support bar 72, while a second rear mounting plate 84 is secured between and supported by the second lower side bar 24 and the second rear support bar 74. First and second front caster assemblies 88, 90 are mounted to the first and second front mounting plates 78, 80, respectively, while first and second rear caster assemblies 92, 94 are mounted to the first and second rear mounting plates 82, 84, respectively. The first and second front caster assemblies 88, 90 and the first and second rear caster assemblies 92, 94 each comprise one of the wheels 14 rotatably mounted between a pair of downwardly-extending brackets 96.

It should be appreciated that the present invention is in no way limited to the particular construction of the body 12 described above. The body 12 can have many different types of construction without limiting the scope of the present invention.

The recessed hitch apparatus 16 is adapted to securably receive a front portion of the tongue 20 of another cart 10. The recessed hitch apparatus 16 includes a receiving port 100 and a pin locking assembly 102.

The receiving port 100 is formed in the lower rear bar 44 by an angular plate 104 (shown in FIG. 2) extending between an enlarged rear opening formed in an outer wall 108 of the lower rear bar 44 and a more narrow opening formed in an inner wall 110 of the lower rear bar 44. A bend in the angular plate 104 is disposed forward of the inner wall 110, while outer ends of the angular plate are joined to the outer wall 108 at the rear opening. The angular plate 104 and the lower rear bar 44 cooperate to define a recess 112 of the receiving port 100. The recess 112 has a rounded triangular shape and is adapted to receive the front portion of the tongue 20 of another cart 10.

The pin locking assembly 102 includes a mounting base 114 that is joined to the lower rear bar 44 and is vertically aligned with the center of the recess 112 of the receiving port 100. A vertically-extending bore extends through the mounting base 114 and is aligned with openings in top and bottom walls 116, 118 of the lower rear bar 44. The bore in the mounting base 114 and the openings in the lower rear bar 44 are aligned with the recess 112 so as to define a vertically-extending pin passage. A locking pin 120 is mounted to the mounting base 114 so as to be vertically movable within the pin passage. The locking pin 120 is movable between a release position, wherein a bottom portion of the locking pin 120 is disposed above the recess 112, and a locking position, wherein the locking pin 120 fully extends through the pin passage such that the bottom portion of the locking pin 120 is disposed below the bottom wall 118 of the lower rear bar 44. The locking pin 120 is biased by a spring (not shown) toward the locking position.

A first end of a hitch cable 122 is secured to an eyelet 124 on an upper end of the locking pin 120. The hitch cable 122 extends vertically upward to the upper rear bar 42 and then extends laterally outward, toward the first rear post 34. A handle loop 128 is formed in the hitch cable 122, proximate to the first rear post 34. The hitch cable 122 is attached to the upper rear bar 42 by a first bracket 130 positioned at a base or neck of the handle loop 128 where the handle loop 128 joins the rest of the hitch cable 122. Preferably, at least one other bracket (not shown), spaced inwardly from the first bracket 130, is provided for attaching the hitch cable 122 to the upper rear bar 42. The first bracket 130 and other bracket(s) hold the hitch cable 122 so as to permit the hitch cable 122 to move laterally inward and outward. The handle loop 128 of the hitch cable 122 is movable between an activated position, wherein the neck of the handle loop 128 is disposed laterally outward from the first bracket 130, and a deactivated position, wherein the neck of the handle loop 128 is disposed against the first bracket 130. The movement of the handle loop 128 from the deactivated position to the activated position moves the locking pin 120 from the locking position to the release position.

Figure 4:
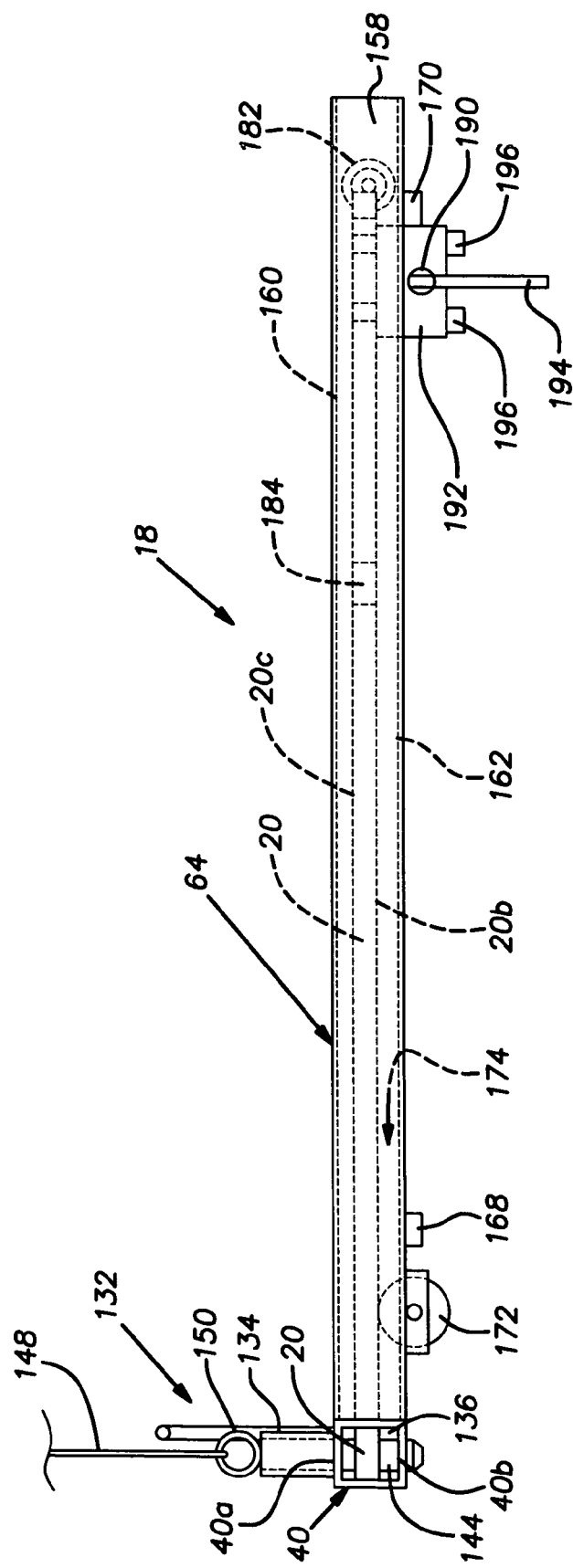
FIG. 4 is a side view of a tongue apparatus of the first cart.

Referring now to FIG. 4, the tongue apparatus 18 generally includes the tongue 20, which is telescopically mounted to the housing 64, and a tongue locking apparatus 132 for locking the tongue 20 in position relative to the housing 64.

The tongue locking apparatus 132 includes a mounting base 134 that is joined to the lower front bar 40 and is vertically aligned with an enlarged tongue passage 136 extending through the lower front bar 40 in the longitudinal direction of the cart 10. A vertically-extending bore extends through the mounting base 134 and is aligned with openings in top and bottom walls 40a, 40b of the lower front bar 40. The bore in the mounting base 134 and the openings in the lower front bar 40 are aligned with the tongue passage 136 so as to define a vertically-extending pin passage. A locking pin 144 is mounted to the base 134 so as to be vertically movable within the pin passage. The locking pin 144 is movable between a release position, wherein a bottom portion of the locking pin 144 is disposed above the tongue passage 136, and a locking position, wherein the locking pin 144 fully extends through the pin passage such that the bottom portion of the locking pin 144 is disposed below the bottom wall 40b of the lower front bar 40. The locking pin 144 is biased by a spring toward the locking position.

A first end of a tongue lock cable 148 is secured to an eyelet 150 on an upper end of the locking pin 144. The tongue lock cable 148 extends vertically upward to the upper front bar 38 and then extends laterally outward, toward the first front post 30. A handle loop 152 is formed in the tongue lock cable 148, proximate to the first front post 30. The tongue lock cable 148 is attached to the upper front bar 38 by a first bracket 154 positioned at a base or neck of the handle loop 152 where the handle loop 152 joins the rest of the tongue lock cable 148. Preferably, at least one other bracket (not shown), spaced inwardly from the first bracket 154, is provided for attaching the tongue lock cable 148 to the upper front bar 38. The first bracket 154 and other bracket(s) hold the tongue lock cable 148 so as to permit the tongue lock cable 148 to move laterally inward and outward. The handle loop 152 of the tongue lock cable 148 is movable between an activated position, wherein the neck of the handle loop 152 is disposed laterally outward from the first bracket 154, and a deactivated position, wherein the neck of the handle loop 152 is disposed against the first bracket 154. The movement of the handle loop 152 from the deactivated position to the activated position moves the locking pin 144 from the locking position to the release position.

The housing 64 is preferably composed of a strong and rigid material, such as steel, and is rectangular in shape. The housing 64 includes a pair of opposing side walls 158 joined between top and bottom walls 160, 162. A roller opening 164 (shown in FIG. 2) and a longitudinal slot 166 (shown in FIG. 2) are formed in the bottom wall 162 and are separated from each other by an intervening portion of the bottom wall 162. A first block or stop 168 is secured to the intervening portion and projects downwardly therefrom. A second block or stop 170 is secured to the bottom wall 162, toward the rear of the housing 64. A front roller assembly is mounted to the bottom wall 162 of the housing, over the roller opening 164. The front roller assembly includes a rotatable front roller 172 that partially extends through the roller opening 164.

As best shown in FIG. 2, the housing 64 is laterally centered between the first and second lower side bars 22, 24 and longitudinally extends between the lower front bar 40 and the second lateral beam 62, with an anterior end of the housing 64 being joined (by welding or otherwise) to the lower front bar 40 and a posterior end of the housing 64 being joined (by welding or otherwise) to the second lateral beam 62. The anterior end of the housing 64 is joined to the lower front bar 40 around the tongue passage 136 that extends through the lower front bar 40. The housing 64 defines an interior channel 174 for receiving the tongue 20 and has a front opening aligned with the tongue passage 136 in the lower front bar 40.

Figure 5:
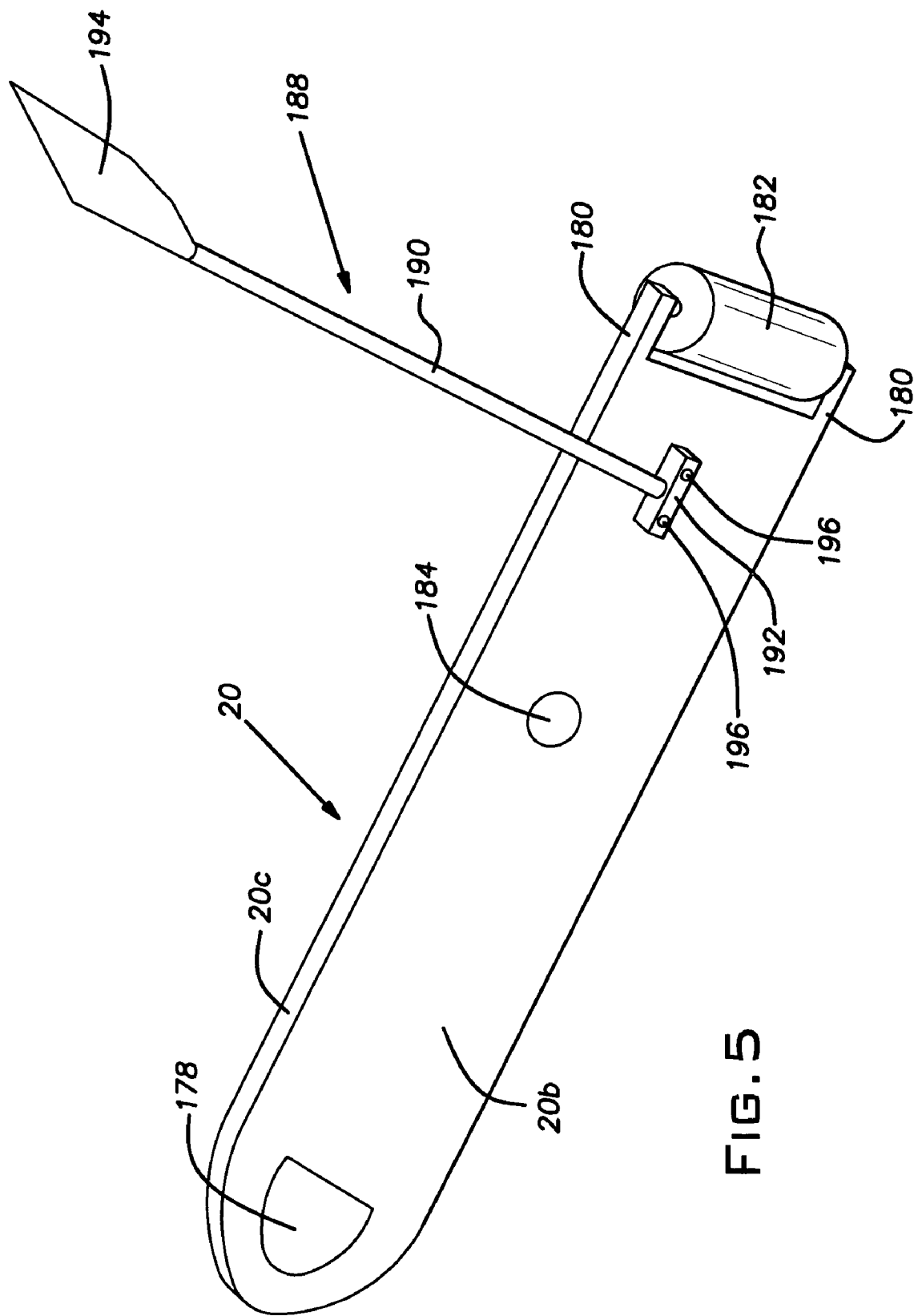
FIG. 5 is a bottom perspective view of a tongue of the tongue apparatus of the first cart.

With particular reference now to FIG. 5, the tongue 20 is generally rectangular in shape and includes a substantially planar top surface 20a, substantially planar bottom surface 20b and a narrowed front portion with an enlarged engagement opening 178 formed therein. A rear portion of the tongue 20 is bifurcated and includes a pair of spaced-apart mounting extensions or arms 180. A rear roller 182 is rotatably mounted between the arms 180. A pair of mounting holes (not shown) are formed in the tongue 20, toward the rear portion of the tongue 20. An enlarged lock opening 184 is formed in the tongue 20, between the engagement opening 178 and the mounting holes, and is positioned toward the rear portion of the tongue 20.

A pedal activation apparatus 188 is secured to the tongue and extends laterally outward therefrom. The pedal activation apparatus 188 includes an extension bar 190 having an inner end portion secured to a mounting block 192 and an outer end portion secured to a foot plate 194. The extension bar 190, the mounting block 192 and the foot plate 194 are all preferably composed of a strong rigid material, such as steel. The mounting block 192 is secured to the tongue 20 by a pair bolts 196 extending through the mounting block 192 and the mounting holes in the tongue 20. The mounting block 192 secures the extension bar 190 to the tongue 20 such that the extension bar 190 extends substantially perpendicular to the tongue 20. The foot plate 194 is generally rectangular in shape and has planar front and back surfaces. The foot plate 194 is sized to permit an operator to fully contact the foot plate 194 with an end portion of the operator's foot.

Referring back to FIGS. 2 and 4, the tongue 20 is disposed in the interior channel 174 of the housing 64, with the top and bottom surfaces 20a, 20b thereof disposed substantially parallel to the top and bottom walls 160, 162 of the housing 64 and with the front portion of the tongue 20 disposed toward the anterior end of the housing 64. The bottom surface 20b of the tongue 20 is disposed on and partially supported by the front roller 172 of the housing 64, while the rear roller 182 of the tongue 20 is disposed on and is supported by the bottom wall 162 of the housing 64. In this manner, the tongue 20 is movably supported above the bottom wall 162 of the housing 64 by the front roller 172 of the housing 64 and the rear roller 182 of the tongue 20. The mounting block 192 of the pedal activation apparatus 188 is aligned with, and extends through, the slot 166 in the bottom wall 162 of the housing 64. The mounting block 192 spaces the extension bar 190 downwardly so as to be disposed below the bottom wall 162 of the housing 64. The extension bar 190 extends laterally outward so as to position an outer vertical edge of the foot plate 194 just inwardly from the first side structure 52. Both the extension bar 190 and the foot plate 194 are disposed just below the base structure 56. This positioning of the foot plate 194 permits the foot plate 194 to be readily accessed by the foot of an operator standing proximate to the first side structure 52, but does not increase the outer dimensions of the cart 10 so as to adversely affect maneuverability of the cart 10. The foot plate 194 is movable between a deactivated position, wherein the foot plate 194 is disposed distal to the first front caster assembly 88, and an activated position, wherein the foot plate 194 is disposed proximate to the first front caster assembly 88. The positioning of the first and second stops 168, 170 on the housing 64 determines the activated and deactivated positions of the foot plate 194, i.e., when the foot plate 194 is in the deactivated position, the mounting block 192 contacts the second stop 170, and when the foot plate 194 is in the activated position, the mounting block 192 contacts the first stop 168.

With the tongue 20 mounted to the housing 64 in the above-described manner, the tongue 20 is movable between an extended position, wherein a majority of the tongue 20 is disposed exterior to the housing 64 and forwardly of the cart 10, and a retracted position, wherein the tongue 20 is fully disposed in the housing 64, under the base structure 56. As the tongue 20 is moved from the retracted position to the extended position, the tongue 20 passes through the tongue passage 136 in the lower front bar 40. When the tongue 20 is in the retracted position, the engagement opening 178 in the tongue 20 is vertically aligned with the pin passage extending through the lower front bar 40 and the tongue locking apparatus 132, whereas when the tongue 20 is in the extended position, the lock opening 184 in the tongue 20 is vertically aligned with the pin passage. Thus, when the tongue 20 is in the retracted position and the locking pin 144 is in the locking position, the locking pin 144 extends through the engagement opening 178, thereby preventing any substantial longitudinal movement of the tongue 20 away from the retracted position, i.e., the tongue 20 is locked in the retracted position. Similarly, when the tongue 20 is in the extended position and the locking pin 144 is in the locking position, the locking pin 144 extends through the lock opening 184, thereby preventing any substantial longitudinal movement of the tongue 20 away from the extended position, i.e., the tongue 20 is locked in the extended position.

The pedal activation apparatus 188 is configured such that when the tongue 20 is in the retracted position, the foot plate 194 is in the deactivated position and when the tongue 20 is in the extended position, the foot plate 194 is in the activated position.

The pedal activation apparatus 188 is operable to move the tongue 20 from the retracted position to the extended position by moving the foot plate 194 from the deactivated position to the activated position. More specifically, if the tongue 20 is in the retracted position and it is desired to move the tongue 20 to the extended position, an operator stands proximate to the foot plate 194, pulls the handle loop 152 of the tongue lock cable 148 to the activated position and, while holding the handle loop 152 in the activated position, applies a forwardly-directed force to the rear surface of the foot plate 194 with his/her foot. The force applied to the foot plate 194 is conveyed to the tongue 20 through the extension bar 190, thereby causing the tongue 20 to move forwardly, toward the extended position. As the tongue 20 moves forwardly, the mounting block 192 of the pedal activation apparatus 188 moves through the slot 166 in the bottom wall 162 of the housing 64. When the mounting block 192 contacts the first stop 168 on the bottom wall 162 of the housing 64, further forward movement of the tongue 20 is prevented and the tongue 20 is positioned in the extended position. At this point, the operator releases the handle loop 152, which causes the locking pin 144 to move through the lock opening 184 in the tongue 20 and into the locking position, thereby locking the tongue 20 in the extended position.

In a similar manner, the pedal activation apparatus 188 is operable to move the tongue 20 from the extended position to the retracted position by moving the foot plate 194 from the activated position to the deactivated position. More specifically, if the tongue 20 is in the extended position and it is desired to move the tongue 20 to the retracted position, an operator stands proximate to the foot plate 194, pulls the handle loop 152 of the tongue lock cable 148 to the activated position and, while holding the handle loop 152 in the activated position, applies a rearwardly-directed force to the front surface of the foot plate 194 with his/her foot. The force applied to the foot plate 194 is conveyed to the tongue 20 through the extension bar 190, thereby causing the tongue 20 to move rearwardly, toward the retracted position. As the tongue 20 moves rearwardly, the mounting block 192 of the pedal activation apparatus 188 moves through the slot 166 in the bottom wall 162 of the housing 64. When the mounting block 192 contacts the second stop 170 on the bottom wall 162 of the housing 64, further rearward movement of the tongue 20 is prevented and the tongue 20 is positioned in the retracted position. At this point, the operator releases the handle loop 152, which causes the locking pin 144 to move through the engagement opening 178 in the tongue 20 and into the locking position, thereby locking the tongue 20 in the retracted position.

When the tongue 20 is in the extended position, the tongue 20 may be inserted into the recess 112 of the receiving port 100 of another cart 10. In order to do so, the operator first pulls the handle loop 128 of the hitch cable 122 of the other cart 10 to the activated position. While holding the handle loop 128 in the activated position, the operator moves the other cart 10 to position the receiving port 100 over the tongue 20 such that the front portion of the tongue 20 is disposed in the recess 112 and the engagement opening 178 of the tongue 20 is aligned with the pin passage of the receiving port 100. The operator then releases the loop handle 128 of the hitch cable 122, which causes the locking pin 120 to move through the engagement opening 178 in the tongue 20 and into the locking position, thereby locking the tongue 20 to the receiving port 100 of the other cart 10.

Figure 6:
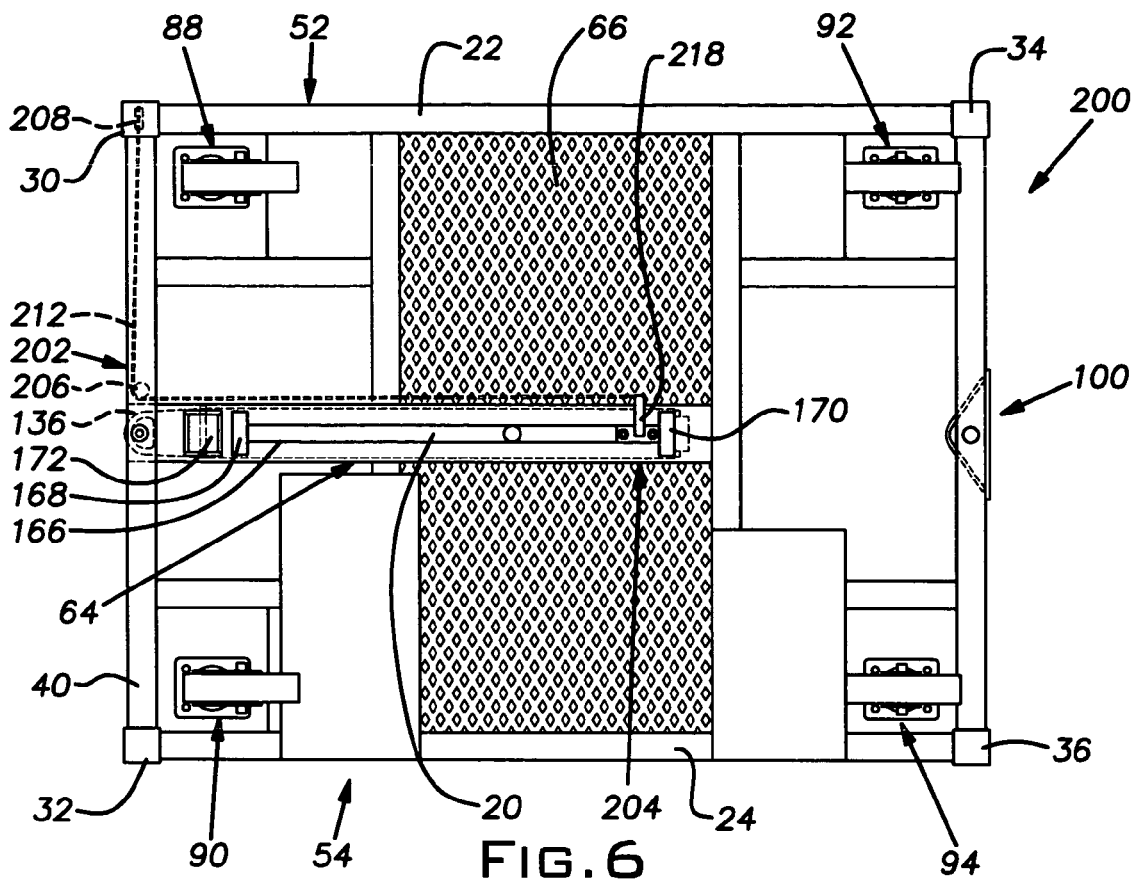
FIG. 6 is a bottom plan view of a second cart embodied in accordance with a second embodiment of the present invention.
Figure 7:
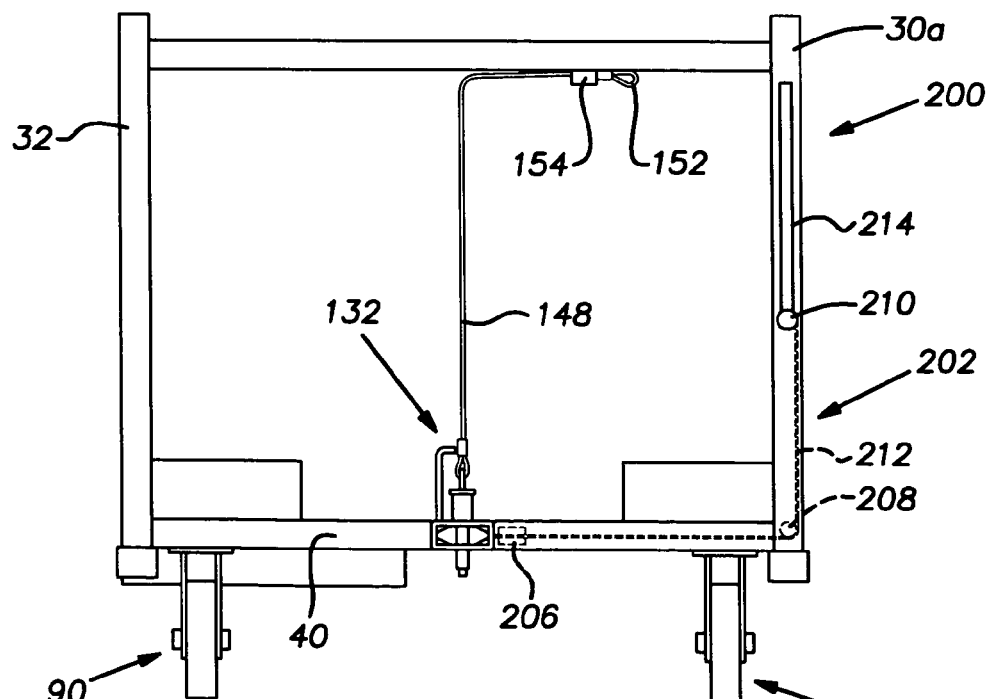
FIG. 7 is a front view of the second cart.

Referring now to FIGS. 6 and 7, there is shown a second cart 200 constructed in accordance with a second embodiment of the present invention. The second cart 200 has the same construction as the cart 10, except for the differences set forth below. The second cart 200 does not have the pedal activation apparatus 188. Instead, the second cart 200 has a cable activation apparatus 202, which includes a connection mount 204, a first pulley 208, a second pulley 206, a handle knob 210 and a tongue activation cable 212. In addition, a vertically-extending slot 214 is formed in a front wall 30a of the first front post 30. The slot 214 is partially defined by an interior top edge of the front wall 30a and an interior bottom edge of the front wall 30a.

The connection mount 204 is secured to the tongue 20 in place of the mounting block 192 of the pedal activation apparatus 188 and in a manner similar thereto. The connection mount 204 preferably has an angled arm 218 that extends downwardly and then laterally, toward the first side structure 52. The arm 218 has a free mounting end.

The first pulley 208 is mounted to the first front post 30, toward the bottom thereof. The first pulley 208 is rotatable around a horizontal axis extending in the direction of the first side structure 52. Preferably, the first pulley 208 is mounted inside the first front post 30, however, it is contemplated that the first pulley 208 could mounted be externally to the first front post 30.

The second pulley 206 is mounted to the lower front bar 40, between the tongue passage 136 and the first side structure 52. The second pulley 206 is rotatable around a vertical axis and is positioned such that an outer circumference of the second pulley 206 is aligned with the mounting end of the connection mount 204. Preferably, the second pulley 206 is mounted inside the lower front bar 40, however, it is contemplated that the second pulley 206 could mounted be externally to the lower front bar 40.

The handle knob 210 extends through and is slidable along the slot 214 in the front wall 30a of the first front post 30. The handle knob 210 includes a cylindrical grip disposed outside the first front post 30 and a connector body disposed inside the first front post 30. The handle knob 210 is slidable along the slot 214 between an activated position, wherein the handle knob 210 contacts the top edge partially defining the slot 214, and a deactivated position, wherein the handle knob 210 contacts the bottom edge partially defining the slot 214.

An outer or first end of the tongue activation cable 212 is secured to the connector body of the handle knob 210. From the connection body, the tongue activation cable 212 extends downwardly through the first front post 30 to the first pulley 208. The tongue activation cable 212 extends partly around the first pulley 208, thereby changing direction so as to extend laterally inward. After the first pulley 208, the tongue activation cable 212 extends laterally through the lower front bar 40 to the second pulley 206. The tongue activation cable 212 extends partly around the second pulley 206 so as to again change direction and extend rearwardly. After the second pulley 206, the tongue activation cable 212 exits the lower front bar 40 through an opening in a rear wall of the lower front bar 40 and extends rearwardly to the connection mount 204, where an inner or second end of the tongue activation cable 212 is secured to the mounting end of the arm 218. The cable activation apparatus 202 is configured such that when the tongue 20 is in the retracted position, the handle knob 210 is in the deactivated position, and when the tongue 20 is in the extended position, the handle knob 210 is in the activated position.

The cable activation apparatus 202 is operable to move the tongue 20 from the retracted position to the extended position by moving the handle knob 210 from the deactivated position to the activated position. More specifically, when an operator moves the handle knob 210 from the deactivated position to the activated position, an upwardly-directed pulling force is applied to the first end of the tongue activation cable 212. This upwardly-directed force is translated by the first and second pulleys 208, 206 to a forwardly-directed pulling force that is applied to the second end of the tongue activation cable 212 and, thus, to a rear portion of the tongue 20 through the connection mount 204. This forwardly-directed moving force moves the tongue 20 forwardly, toward the extended position. When the handle knob 210 contacts the top edge, further upward movement of the handle knob 210 is prevented. At this point, the tongue 20 is disposed in the extended position and the handle knob 210 is in the activated position.

When it is desired to move the tongue 20 back to the retracted position, the operator physically pushes the tongue 20 back into the housing 64 through a direct application of force to the tongue 20. Alternately, a cable deactivation assembly (not shown) may be provided, which is similar in construction to the cable activation apparatus 202, except the cable deactivation assembly is connected to a forward portion of the tongue 20 and is operable to pull the tongue 20 rearward from the extended position to the retracted position.

Of course, in the above-described operation of the cable activation apparatus 202 and the cable deactivation assembly, the tongue locking apparatus 132 is appropriately manipulated to unlock and lock the tongue 20 as required.

Referring now to FIGS. 8 and 9, there is shown a third cart 220 embodied in accordance with a third embodiment of the present invention. The third cart 220 has the same construction as the cart 10, except for the differences set forth below. The third cart 220 does not have the pedal activation apparatus 188. Instead, the third cart 220 has a slide activation apparatus 222. In addition, the housing 64 of the tongue apparatus 18 does not have the slot 166 and the first and second stops 168, 170. Also, a pair of longitudinally-extending, aligned slots 224 are formed in inner and outer walls 22a, 22b of the first lower side bar 22.

The slide activation apparatus 222 includes an extension rod 226 having an inner or second end portion that is secured to the tongue 20 such that the extension rod 226 extends laterally outward from the tongue 20 in perpendicular fashion. The second end portion of the extension rod 226 is preferably threaded and is threadably secured in a threaded bore extending through a first side wall 20c of the tongue 20. An outer or first end portion of the extension rod 226 extends through the aligned slots 224 and is secured to a foot pedal 228, which is disposed exteriorly of the first lower side bar 22. Each of the slots 224 is partially defined by interior front and rear edges. The aligned slots 224 permit the foot pedal 228 to be movable along the length of the aligned slots 224 between a deactivated position, wherein the extension rod 226 contacts the interior rear edges, and an activated position, wherein the extension rod 226 contacts the interior front edges. The slide activation apparatus 222 is configured such that when the tongue 20 is in the retracted position, the foot pedal 228 is in the deactivated position, and when the tongue 20 is in the extended position, the foot pedal 228 is in the activated position. A roller 232 is rotatably mounted to the extension rod 226 inside the first lower side bar 22. The roller 232 is supported on a bottom wall 22c of the first lower side bar 22 and has an axial passage through which the extension rod 226 extends. The axial passage may be provided with bearings to facilitate the rotation of the roller 232.

The slide activation apparatus 222 is operable to move the tongue 20 from the retracted position to the extended position by moving the foot pedal 228 from the deactivated position to the activated position. More specifically, when an operator applies a forwardly-directed force to a rear surface of the foot pedal 228 with his/her foot, the forwardly-directed force is conveyed to the tongue 20 through the extension rod 226, thereby causing the tongue 20 to move forwardly, toward the extended position. As the tongue 20 moves forwardly, the extension rod 226 moves forwardly through the aligned slots 224 and the roller 232 rolls forwardly over the bottom wall 22c of the first lower side bar 22. When the extension rod 226 contacts the interior front edges defining the aligned slots 224, further forward movement of the extension rod 226 and, thus, the tongue 20 is prevented. At this point, the tongue 20 is disposed in the extended position and the foot pedal 228 is in the activated position.

In a similar manner, the slide activation apparatus 222 is operable to move the tongue 20 from the extended position to the retracted position by moving the foot pedal 228 from the activated position to the deactivated position. More specifically, when an operator applies a rearwardly-directed force to a front surface of the foot pedal 228 with his/her foot, the rearwardly-directed force is conveyed to the tongue 20 through the extension rod 226, thereby causing the tongue 20 to move rearwardly, toward the retracted position. As the tongue 20 moves rearwardly, the extension rod 226 moves rearwardly through the aligned slots and the roller 232 rolls rearwardly over the bottom wall 22*c* of the first lower side bar 22. When the extension rod 226 contacts the interior rear edges defining the aligned slots 224, further rearward movement of the extension rod 226 and, thus, the tongue 20 is prevented. At this point, the tongue 20 is disposed in the retracted position and the foot pedal 228 is in the deactivated position.

Of course, in the above-described operation of the slide activation apparatus 222, the tongue locking apparatus 132 is appropriately manipulated to unlock and lock the tongue 20 as required.

Figure 10:
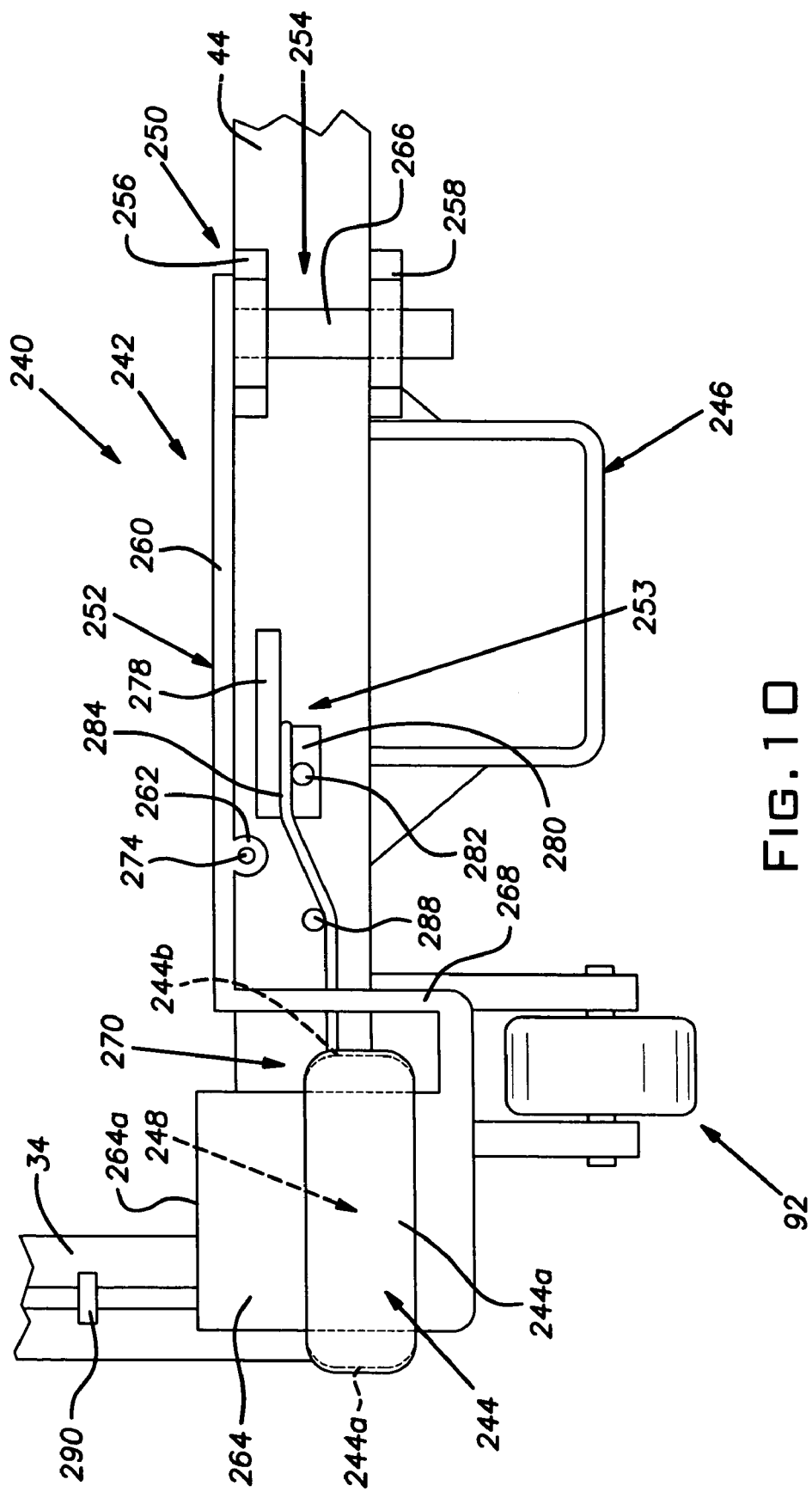
FIG. 10 is a rear view of a portion of a fourth cart embodied in accordance with a fourth embodiment of the present invention.

Referring now to FIG. 10, there is shown a rear portion of a fourth cart 240 embodied in accordance with a fourth embodiment of the present invention. The fourth cart 240 has the same construction as the cart 10, except for the differences set forth below. The fourth cart 240 does not have the recessed hitch apparatus 16. Instead, the fourth cart 240 has an extended hitch apparatus 242. In addition, the fourth cart 240 has a rear first bumper 244, a rear second bumper (not shown) and a fork lift channel 246 for receiving tine(s) of a fork lift.

The first bumper 244 and the second bumper are joined to the lower rear bar 44 and extend rearwardly therefrom. The first bumper 244 is disposed proximate to the first rear post 34, while the second bumper is disposed proximate to the second rear post 36. The first bumper 244 and the second bumper have the same construction. Therefore, only the construction of the first bumper 244 will be described. The first bumper 244 is channel shaped and includes a center plate 244*a* joined between inner and outer arms 244*b,c*. The inner and outer arms 244*b,c* extend at substantially right angles from the center plate 244*a*. Forward ends of the inner and outer arms 244*b,c* are joined to the lower rear bar 44 such that the center plate 244*a* of the first bumper 244 is vertically disposed and is spaced rearwardly from the lower rear bar 44. In this manner, the first bumper 244 and the second bumper each cooperate with the lower rear bar 44 to define a vertically-extending passage 248.

The extended hitch apparatus 242 includes a hitch 250, an actuator bar 252, and an actuator plate 253.

The hitch 250 includes upper and lower hitch plates 256, 258 that extend rearwardly from the lower rear bar 44. The upper and lower hitch plates 256, 258 are vertically spaced-apart so as to define a tongue-receiving space 254. Aligned openings are formed in the upper and lower hitch plates 256, 258, respectively. The upper and lower hitch plates 256, 258 do not extend rearwardly as far as the first bumper 244 and the second bumper. In this manner, the first bumper 244 and the second bumper protect the hitch 250 from being contacted by another cart 10, which could damage the hitch 250.

The actuator bar 252 includes an elongated body 260 having a first end portion connected to a foot plate 264 and a second end portion joined to a pin 266. A pivot mount 262 is joined to the body 260, toward the first end portion. The pin 266 is disposed at a substantially right angle to the body 260 and extends downwardly therefrom. The pin 266 is cylindrical and is sized to extend through the aligned openings in the upper and lower hitch plates 256, 258. The foot plate 264 is substantially rectangular and is sized to extend through the passage 248 formed by the first bumper 244 and the lower rear bar 44. The foot plate 264 is joined to the first end portion of the body by an L-shaped neck 268. The foot plate 264 and the L-shaped neck 268 cooperate to define a slot 270 having an upper open end and a closed lower end. The L-shaped neck 268 is configured such that a top edge 264*a* of the foot plate 264 is disposed at about the same level as a top surface of the body 260 or above the top surface of the body 260.

The actuator bar 252 is mounted to the lower rear bar 44 such that the second end portion of the body 260 is disposed over the upper hitch plate 256 and the foot plate 264 extends through the passage 248 in the first bumper 244. With the foot plate 264 so positioned, the inner arm 244*b* of the bumper 244 is disposed in the slot 270. The actuator bar 252 is pivotally connected to the lower rear bar 44 by a bolt 274 that extends through the pivot mount 262 and the lower rear bar 44. The actuator bar 252 is pivotable between an activated position (shown in FIG. 10) and a deactivated position. When the actuator bar 252 is in the activated position, the body 260 is disposed substantially horizontal, with the pin 266 extending through the aligned openings in the upper and lower hitch plates 256, 258 and the top edge 264*a* of the foot plate 264 being disposed above the first bumper 244. When the actuator bar 252 is in the deactivated position, the body 260 is disposed at an incline, with the pin 266 being disposed above the tongue-receiving space 254 and the top edge 264*a* of the foot plate 264 being positioned at or below a top edge of the first bumper 244. The actuator bar 252 is configured such that its center of mass is disposed between the second end portion of the body 260 and the pivot mount 262. In this manner, the actuator bar 252 is biased by gravity toward the activated position.

The actuator bar 252 is operable to lock a tongue 20 of another cart 10, 220, 240 to the hitch 250. In order to do so, an operator applies a downwardly-directed force to the top edge 264*a* of the foot plate 264 with his/her foot, thereby causing the foot plate 264 to move downwardly and the actuator bar 252 to move to the deactivated position. While the operator continues to apply the downwardly-directed force to the foot plate 264 with his/her foot, the tongue 20 is inserted into the tongue-receiving space 254 such that the engagement opening 178 is aligned with the aligned openings in the upper and lower hitch plates 256, 258. The operator then removes his/her foot from the foot plate 264, thereby allowing the actuator bar 252 to return to the activated position through the operation of gravity. As the actuator bar 252 returns to the activated position, the pin 266 moves downwardly through the tongue-receiving space 254 and passes through the engagement opening 178 in the tongue 20 and the opening in the lower hitch plate 258, thereby locking the tongue 20 to the hitch 250. When the bottom surface of the body 260 contacts the top surface of the upper hitch plate 256, further downward movement of the pin 266 is prevented and the actuator bar 252 is disposed in the activated position. In order to unlock the tongue 20 from the hitch 250, the operator moves the actuator bar 252 to the deactivated position by once again applying a downwardly-directed force to the top edge 264*a* of the foot plate 264 with his/her foot and then, while holding the actuator bar 252 in the deactivated position, removing the tongue 20 from the tongue-receiving space 254 of the hitch 250.

The actuator plate 253 is generally L-shaped and includes an actuator finger 278 joined at a substantially right angle to a base 280. The base 280 is pivotally mounted to the lower rear bar 44 by a bolt 282 extending through the base 280 and the lower rear bar 44. The actuator plate 253 is movable between a disengaged position, wherein the actuator finger 278 is disposed substantially horizontal and is spaced below the body 260 of the actuator bar 252, and an engaged position, wherein the actuator finger 278 extends upwardly and engages the actuator bar 252 such that the actuator bar 252 is disposed in the deactivated position. A lower end of a cable 284 is connected to the actuator plate 253 at the juncture between the actuator finger 278 and the base 280. From the actuator plate 253, the cable 284 extends laterally to the first rear post 34 and then upwardly, preferably to the upper rear bar 42. A handle loop (not shown) may be formed in the cable 284, proximate to the upper rear bar 42. A plurality of rollers 288 are rotatably mounted to the lower rear bar 44 to help guide the cable 284. In addition, a plurality of brackets 290 are provided to attach the cable 284 to the lower rear bar 44 and the first rear post 34. At least one of the brackets 290 is positioned at a base or neck of the handle loop where the handle loop joins the rest of the cable 284. The brackets 290 hold the cable 284 so as to permit the handle loop to move vertically between an upward, activated position and lower, deactivated position. The movement of the handle loop from the deactivated position to the activated position moves the actuator plate 253 from the disengaged to the engaged position. More specifically, when the handle loop is pulled upwardly by an operator, the cable 284 applies an outwardly-directed force to the actuator plate 253, which causes the actuator plate 253 to pivot such that the actuator finger 278 moves upwardly into contact with a bottom surface of the body 260 of the actuator bar 252. As the actuator finger 278 continues to move upward, the actuator finger 278 applies an upwardly-directed force to the actuator bar 252, thereby causing the actuator bar 252 to pivot to the deactivated position. When the handle loop is released, gravity causes the actuator bar 252 to pivot back to the activated position, thereby moving the actuator plate 253 back to the disengaged position.

From the foregoing description, it should be appreciated that the actuator bar 252 can be moved between the activated and deactivated positions by manipulating either the foot plate 264 or the cable 284 connected to the actuator plate 253. In other embodiments of the present invention, this redundancy can be eliminated by removing the foot plate 264 or the actuator plate 253. For example, in a fifth embodiment of the present invention, the actuator plate 253, the cable 284, the rollers 288 and the brackets 290 are not present, and the actuator bar 252 is moved between the deactivated and activated positions solely by manipulating the foot plate 264, as described above. In a sixth embodiment, the actuator bar 252 terminates just after the pivot mount 262 (in the direction toward the first rear post 34) and, thus, does not include the foot plate 264. The shortened actuator bar 252 is moved between the deactivated and activated positions solely by manipulating the cable 284 connected to the actuator plate 253.

It should be appreciated that instead of having the pedal activation apparatus 188, the fourth cart 240 can have the cable activation apparatus 202, or the slide activation apparatus 222. In this regard, one skilled in the art can readily envision the various combinations that can be made from the tongue activation apparatus and hitch apparatus disclosed herein.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A cart for transporting objects, said cart comprising:
    a base structure upon which the objects may be disposed, said base structure having posterior and anterior ends and opposing first and second sides;
    a pair of first wheels mounted to the base structure and disposed toward a first side of the base structure;
    a pair of second wheels mounted to the base structure and disposed toward a second side of the base structure;
    a housing mounted to the base structure and at least partially defining an interior channel, said housing extending in a longitudinal direction of the cart and being disposed midway along a width of the cart;
    an elongated tongue, said tongue having an inner end and an outer end, said tongue inner end being continuously disposed in the channel while said tongue outer end being adapted for connection to another cart, said elongated tongue being movable between a retracted position, wherein a majority of the tongue is disposed inside the channel, and an extended position, wherein a majority of the tongue is disposed outside the channel; and
    an actuator, said actuator having a proximal end and a distal end, said actuator proximal end being received in the housing and connected to the elongated tongue inner end, said actuator distal end being disposed laterally outward from the housing and the base structure so as to be at a position that is accessible for an operator on said first side of said base structure,
    wherein said actuator distal end is engaged and manipulated by the operator to move the tongue between the retracted and extended positions.

2. The cart of claim 1, wherein the actuator is movable along a linear path between a deactivated position and an activated position, wherein movement of the actuator from the deactivated position to the activated position moves the tongue from the retracted position to the extended position.

3. The cart of claim 2, wherein the actuator includes an elongated extension rod, said rod extending laterally outward from the tongue at about a right angle from the tongue, wherein the actuator is spaced below the base structure.

4. The cart of claim 3, wherein the actuator includes a foot plate having a planar contact surface disposed perpendicular to the longitudinal direction of the cart.

5. The cart of claim 4, wherein when the foot plate is in the activated position, the foot plate is disposed proximate to a front one of the first wheels, and when the foot plate is in the deactivated position, the foot plate is disposed distal to the front one of the first wheels.

6. The cart of claim 5, wherein the foot plate has an outermost vertical edge that is disposed inwardly from an outermost portion of the base structure on the first side of the base structure.

7. The cart of claim 6, wherein the outermost vertical edge of the foot plate is disposed laterally outward from the first wheels when circumferences of the first wheels are aligned.

8. The cart of claim 3, wherein the base structure comprises a frame having first and second side bars at the first and second sides of the base structure, respectively, said first side bar having at least one slot formed therein, said at least one slot extending in the longitudinal direction of the cart, and wherein the actuator is mounted to the first side bar so as to be movable along the at least one slot.

9. The cart of claim 8, wherein the extension rod extends through the at least one slot and is secured to the actuator distal end on a laterally outward side of the at least one slot.

10. The cart of claim 9, wherein the first side bar comprises a bottom wall joined between a pair of opposing inner and outer side walls, wherein the at least one slot comprises a pair of aligned slots formed in the inner and outer side walls, respectively, and wherein the actuator distal end is disposed adjacent an outer surface of the outer side wall and covers a portion of the slot formed therein.

11. The cart of claim 10, wherein the aligned slots are partially defined by interior front and rear edges of the inner and outer side walls, respectively, and wherein the interior front edges determine the activated position of the actuator and the interior rear edges determine the deactivated position of the actuator.

12. The cart of claim 11, further comprising a roller through which the extension rod extends, said roller being supported on the bottom wall of the first side bar, between the inner and outer side walls of the first side bar.

13. The cart of claim 12, wherein the actuator comprises a block-shaped pedal.

14. The cart of claim 2, wherein the actuator includes a cable that connects the actuator distal end to the actuator proximal end.

15. The cart of claim 14, further comprising vertically-extending first and second posts disposed at opposing front corners of the cart, respectively, said first post having a vertically extending slot formed therein, said slot being partially defined by interior top and bottom edges of the first post, and wherein the actuator is mounted to the first post for movement along the slot.

16. The cart of claim 15, wherein the interior top edge determines the activated position of the actuator and the interior bottom edge determines the deactivated position of the actuator.

17. The cart of claim 16, wherein the actuator comprises a grip and a connector body, said grip being disposed adjacent an outer surface of the first post and covering a portion of the slot, and said connector body being disposed inside the first post.

18. The cart of claim 17, wherein a first end of the cable is connected to the connector body, inside the first post, and a second end of the cable is connected to a rear portion of the tongue.

19. The cart of claim 18, further comprising a plurality of pulleys around which the cable extends, said pulleys changing the direction of the cable at least twice.

20. The cart of claim 19, wherein the plurality of pulleys comprises a first pulley mounted to the first post so as to be rotatable around a horizontal axis and a second pulley mounted to the base structure so as to be rotatable around a vertical axis.

21. The cart of claim 20, wherein the first pulley is disposed inside the first post and the second pulley is disposed inside the base structure.

22. The cart of claim 1, further comprising a tongue lock apparatus that is operable to lock the tongue in the extended and retracted positions, said tongue lock apparatus being actuated to unlock the tongue and thereby permit said tongue to move between the retracted and extended positions, wherein said actuator is adapted to be manipulated by the operator to move the tongue between the retracted and extended positions only when said tongue lock apparatus is actuated to unlock the tongue.

23. A cart for transporting objects, said cart comprising:
a base structure upon which the objects may be disposed, said base structure having posterior and anterior ends and opposing first and second sides;
a pair of first wheels mounted to the base structure and disposed toward a first side of the base structure;
a pair of second wheels mounted to the base structure and disposed toward a second side of the base structure;
a housing mounted to the base structure and at least partially defining an interior channel, said housing extending in a longitudinal direction of the cart and being disposed midway along a width of the cart;
an elongated tongue adapted for connection to another cart, said tongue being at least partially disposed in the channel and being movable between a retracted position, wherein a majority of the tongue is disposed inside the channel, and an extended position, wherein a majority of the tongue is disposed outside the channel;
a tongue lock apparatus that is operable to lock the tongue in the extended and retracted positions, said tongue lock apparatus being actuated to unlock the tongue and thereby permit said tongue to move between the retracted and extended positions; and
an actuator, said actuator having a proximal end received in the housing and connected to the tongue and having a distal end disposed laterally outward from the housing at a position that is accessible for an operator,
wherein, when said tongue lock apparatus is actuated to unlock the tongue, said actuator being operable, upon engagement and manipulation by the operator, is engaged and manipulated by the operator to move the tongue from between the retracted position to the and extended position positions,
wherein the housing comprises a bottom wall having a roller opening formed therein, wherein a first roller is mounted to the bottom wall and at least partially extends through the roller opening, and wherein a second roller is mounted to the tongue, and wherein the tongue is movably supported above the bottom wall of the housing by the first and second rollers.

24. The cart of claim 23, wherein the actuator is movable along a linear path between a deactivated position and an activated position, wherein movement of the actuator from the deactivated position to the activated position moves the tongue from the retracted position to the extended position.

25. The cart of claim 24, wherein the actuator includes an elongated extension rod, said rod extending laterally outward from the tongue at about a right angle from the tongue.

26. The cart of claim 25, further comprising front and rear structures and first and second side structures secured to the base structure and extending upwardly therefrom, and wherein the actuator is spaced below the base structure.

27. The cart of claim 26, wherein the actuator includes a foot plate having a planar contact surface disposed perpendicular to the longitudinal direction of the cart.

28. The cart of claim 27, wherein when the foot plate is in the activated position, the foot plate is disposed proximate to a front one of the first wheels, and when the foot plate is in the deactivated position, the foot plate is disposed distal to the front one of the first wheels.

29. The cart of claim 28, wherein the foot plate has an outermost vertical edge that is disposed inwardly from an outermost portion of the base structure on the first side of the base structure.

30. The cart of claim 29, wherein the outermost vertical edge of the foot plate is disposed laterally outward from the first wheels when circumferences of the first wheels are aligned.

31. The cart of claim 24, wherein the base structure comprises a frame having first and second side bars at the first and second sides of the base structure, respectively, said first side bar having at least one slot formed therein, said at least one slot extending in the longitudinal direction of the cart, and wherein the actuator is mounted to the first side bar so as to be movable along the at least one slot.

32. The cart of claim 31, wherein the extension rod extends through the at least one slot and is secured to the actuator distal end on a laterally outward side of the at least one slot.

33. The cart of claim 30, wherein the first side bar comprises a bottom wall joined between a pair of opposing inner and outer side walls, wherein the at least one slot comprises a pair of aligned slots formed in the inner and outer side walls, respectively, and wherein the actuator distal end is disposed adjacent an outer surface of the outer side wall and covers a portion of the slot formed therein.

34. The cart of claim 33, wherein the aligned slots are partially defined by interior front and rear edges of the inner and outer side walls, respectively, and wherein the interior front edges determine the activated position of the actuator and the interior rear edges determine the deactivated position of the actuator.

35. The cart of claim 34, wherein the actuator comprises a block-shaped pedal.

36. The cart of claim 23, wherein the actuator includes a cable that connects the actuator distal end to the actuator proximal end.

37. The cart of claim 36, wherein the interior top edge determines the activated position of the actuator and the interior bottom edge determines the deactivated position of the actuator.

38. The cart of claim 37, further comprising vertically-extending first and second posts disposed at opposing front corners of the cart, respectively, said first post having a vertically extending slot formed therein, said slot being partially defined by interior top and bottom edges of the first post, and wherein the actuator is mounted to the first post for movement along the slot.

39. The cart of claim 38, wherein the actuator comprises a grip and a connector body, said grip being disposed adjacent an outer surface of the first post and covering a portion of the slot, and said connector body being disposed inside the first post.

40. The cart of claim 39, further comprising a plurality of pulleys around which the cable extends, said pulleys changing the direction of the cable at least twice.

41. The cart of claim 40, wherein the first pulley is disposed inside the first post and the second pulley is disposed inside the base structure.

42. The cart of claim 41, wherein the actuator includes an elongated extension rod, said rod extending laterally outward from the tongue at about a right angle from the tongue, wherein the actuator is spaced below the base structure, and wherein the actuator includes a foot plate having a planar contact surface disposed perpendicular to the longitudinal direction of the cart.

43. The cart of claim 41, wherein the base structure comprises a frame having first and second side bars at the first and second sides of the base structure, respectively, said first side bar having at least one slot formed therein, said at least one slot extending in the longitudinal direction of the cart, wherein the actuator is mounted to the first side bar so as to be movable along the at least one slot, and wherein the extension rod extends through the at least one slot and is secured to the actuator distal end on a laterally outward side of the at least one slot.

44. The cart of claim 41, wherein the actuator includes a cable that connects the actuator distal end to the actuator proximal end, said cart further comprising vertically-extending first and second posts disposed at opposing front corners of the cart, respectively, said first post having a vertically extending slot formed therein, said slot being partially defined by interior top and bottom edges of the first post, and wherein the actuator is mounted to the first post for movement along the slot, and wherein the interior top edge determines the activated position of the actuator and the interior bottom edge determines the deactivated position of the actuator.

45. The cart of claim 39, wherein a first end of the cable is connected to the connector body, inside the first post, and a second end of the cable is connected to a rear portion of the tongue.

46. The cart of claim 40, wherein the plurality of pulleys comprises a first pulley mounted to the first post so as to be rotatable around a horizontal axis and a second pulley mounted to the base structure so as to be rotatable around a vertical axis.

* * * * *